United States Patent [19]

Fenty

[11] Patent Number: 5,247,810
[45] Date of Patent: Sep. 28, 1993

[54] FREEZER CONVEYOR

[75] Inventor: John S. Fenty, Humberston, United Kingdom

[73] Assignee: Liquid Carbonic Corporation, Chicago, Ill.

[21] Appl. No.: 913,522

[22] Filed: Jul. 14, 1992

[51] Int. Cl.⁵ .................. F25D 21/14; F25D 23/06; F25D 13/06; B25G 13/02
[52] U.S. Cl. ..................... 62/374; 62/381; 62/63; 198/778
[58] Field of Search ............ 62/374, 63, 381; 198/778

[56] References Cited

U.S. PATENT DOCUMENTS

| | | |
|---|---|---|
| 1,849,237 | 3/1932 | Kinney . |
| 2,872,023 | 2/1959 | Bechtel, Jr. . |
| 3,315,492 | 4/1967 | Dreksler . |
| 3,348,659 | 10/1967 | Roinestad . |
| 3,391,548 | 7/1968 | Gram ................... 62/381 |
| 3,443,505 | 5/1969 | Kaufman, Jr. .......... 62/381 X |
| 3,467,239 | 9/1969 | Roinestad . |
| 3,682,295 | 8/1972 | Roinestad . |
| 3,733,848 | 5/1973 | Duron et al. . |
| 3,826,352 | 7/1974 | Van Zon et al. . |
| 3,857,252 | 12/1974 | Wight . |
| 3,866,432 | 2/1975 | Harrison ................ 62/381 X |
| 3,938,651 | 2/1976 | Alfred et al. . |
| 3,983,989 | 10/1976 | Wahren . |
| 4,078,655 | 3/1978 | Roinestad . |
| 4,138,009 | 2/1979 | Strong . |
| 4,324,110 | 4/1982 | Lovette, Jr. et al. ....... 62/381 |
| 4,485,914 | 12/1984 | Frank . |
| 4,565,282 | 1/1986 | Olsson et al. . |
| 4,603,776 | 8/1986 | Olsson . |
| 4,669,278 | 6/1987 | Lee, Jr. et al. . |
| 4,741,430 | 5/1988 | Roinestad . |
| 4,798,062 | 1/1989 | Lipinski et al. . |
| 4,850,475 | 7/1989 | Lupo et al. . |
| 4,858,750 | 8/1989 | Cawley . |
| 4,866,354 | 9/1989 | Miller . |
| 4,867,301 | 9/1989 | Roinestad et al. . |
| 4,875,343 | 10/1989 | Jeppsson . |
| 4,878,362 | 11/1989 | Tyree, Jr. . |
| 4,899,871 | 2/1990 | Olsson . |
| 4,917,234 | 4/1990 | Seymour . |
| 4,944,162 | 7/1990 | Lang et al. . |
| 4,951,807 | 8/1990 | Roinestad et al. . |
| 5,031,751 | 7/1991 | Pahlsson ................ 62/381 X |

FOREIGN PATENT DOCUMENTS

| | | |
|---|---|---|
| 21748/83 | 8/1987 | Australia . |
| 0293095 | 11/1988 | European Pat. Off. . |
| 2146367 | 7/1972 | France . |
| WO/87/04136 | 7/1987 | PCT Int'l Appl. . |

Primary Examiner—Henry A. Bennet
Assistant Examiner—Christopher Kilner
Attorney, Agent, or Firm—Fitch, Even, Tabin & Flannery

[57] ABSTRACT

A conveyor freezer employing a self-supporting conveyor arranged in a helical stack for carrying discrete food items into the freezer, through the helical stack for a predetermined period of time, and out of the freezer. A major portion of the weight of the helical belt stack is supported by a rotatable turntable A portion of the lowermost tier of the stack is elevated and supported by a ramp structure which preferably comprises a pair of runners engaging lower surfaces of outwardly extending flange portion of side links of the belt. The belt is preferably driven by a single drive unit at a location outside of the freezer enclosure, remote from the stack, by a single pair of sprockets. A timing sprocket is preferably employed to control belt pitch along the infeed section of the belt.

4 Claims, 2 Drawing Sheets

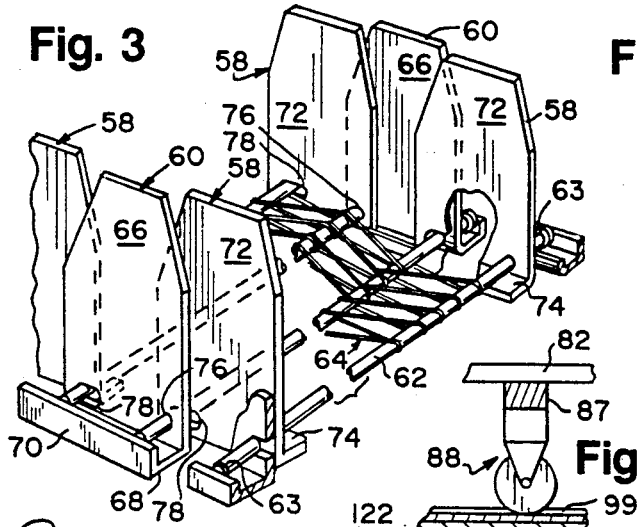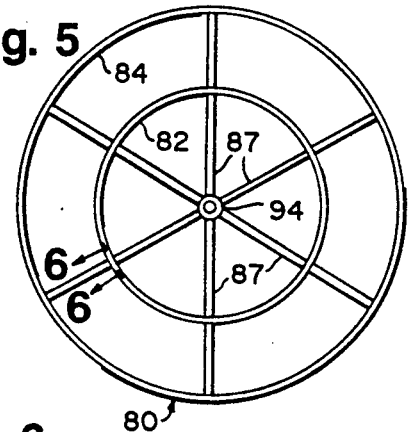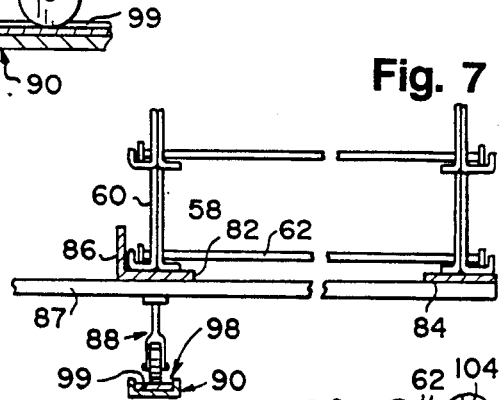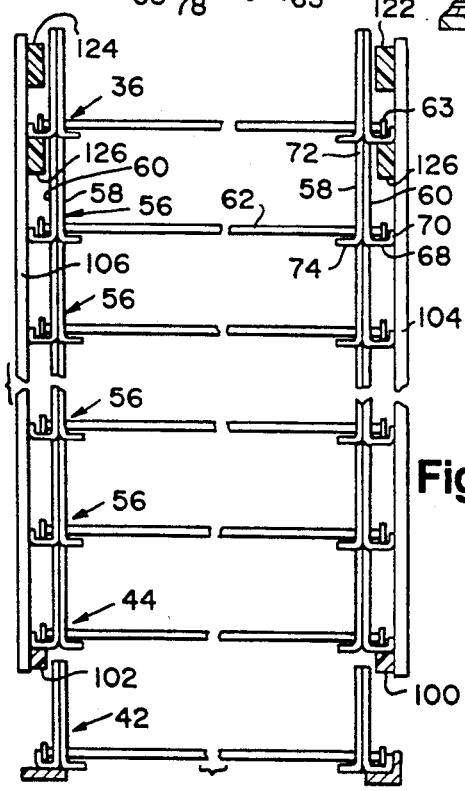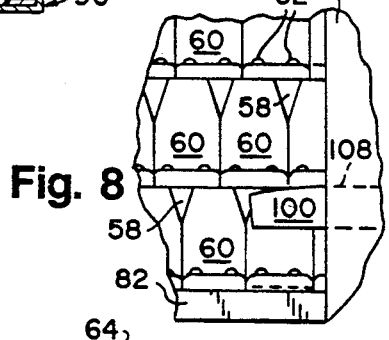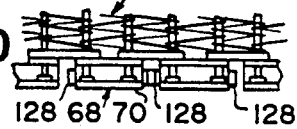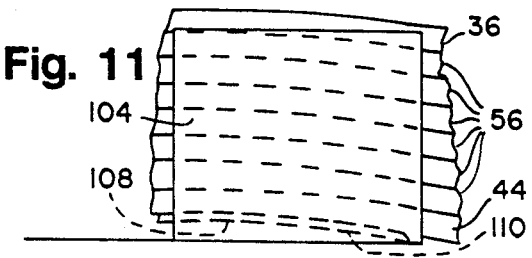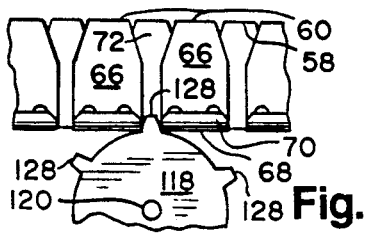

FREEZER CONVEYOR

BACKGROUND OF THE INVENTION

The invention relates generally to conveyors and, more particularly, to a conveyor capable of transporting food product through a freezer in a helical path.

The use of helical or spiral conveyors for carrying food product through freezers enables acceptable dwell time to be maintained in conjunction with acceptable product throughput rates, with efficient use of space. U.S. Pat. No. 3,315,492 discloses a freezer employing such a helical conveyor, wherein the tiers of the conveyor are supported by horizontal arms which extend into the stack. It has been recognized that compactness of freezers of this type may be improved by increasing the number of tiers without increasing the vertical dimension of the freezer, by making the belt self-supporting, which enables the horizontal arms to be eliminated, thereby permitting closer spacing of adjacent tiers while maintaining desired clearance for product. U.S. Pat. No. 3,938,651 discloses a conveyor arrangement wherein the belt is arranged in a self-supporting stack and the stack is supported on a second conveyor which is driven to rotate the stack. However, provision of a satisfactory conveyor for supporting the stack has proven to be problematic, and it has been found that a helical belt stack manufactured in accordance with the teachings of this patent are susceptible to collapsing under certain conditions.

U.S. Pat. No. 4,565,282 states as one of its objects to eliminate the disadvantages of prior art installations such as that of U.S. Pat. No. 3,938,651, which have not been able to carry the pile or stack through a continuous complete revolution due to the ingoing or outgoing lower part of the conveyor belt. The installation of U.S. Pat. No. 4,565,282 comprises two endless chains which are arranged under the belt pile so as to carry the belt through a complete revolution. However, the arrangement of U.S. Pat. No. 4,565,282 is complicated and expensive and is believed to be susceptible to problems due to ice formation interfering with proper functioning of rolling elements in the apparatus. U.S. Pat. No. 4,899,871 discloses an arrangement which is intended to address the problem of ice formation obstructing ball movement by employing a chain comprising overlapping links which are intended to exclude ice from the path of rolling elements. This proposed arrangement further increases the number of moving parts and adds to the expense and complexity of the apparatus.

SUMMARY OF THE INVENTION

In accordance with the invention, there is provided a novel and improved conveyor system of the type employing a self-supporting helical belt stack.

In accordance with one aspect of the invention, a major portion of the weight of the helical belt stack is supported by a rotatable turntable. The turntable is preferably substantially rigid and oriented horizontally. In the preferred embodiment, the belt enters the helical stack at the upper end thereof and exits the helical stack at the lower end thereof. In other embodiments, the belt may proceed in the reverse direction.

In accordance with a further aspect of the invention, the helical belt stack is located within an enclosure and is driven by a drive unit which engages the belt outside of the freezer enclosure, and does not drive the turntable directly. One or more timing sprockets may be employed to maintain desired belt pitch at one or more locations along the path of the conveyor belt. In accordance with an additional aspect of the preferred embodiment of the invention, a portion of the lowermost tier of the stack is elevated and supported by ramp means which provide clearance for belt discharged from the stack therebeneath, then is guided in a downwardly sloping path to the turntable. The ramp means preferably comprise a pair of runners which engage lower surfaces of outwardly extending flange portions of the side links of the belt.

The turntable preferably comprises a substantially rigid structure having inner and outer circular rails for supporting respective inner and outer sides of the belt arranged in the helical belt stack.

Further aspects of the invention may be appreciated from the following description and claims, and the accompanying drawings.

BRIEF DESCRIPTION OF THE DRAWINGS

FIG. 3 is a perspective view showing a portion of the conveyor in detail, with portions broken away and portions shown in section for illustrative purposes;

FIG. 4 is a diagrammatic sectional elevational taken substantially along line 4—4 of FIG. 2;

FIG. 5 is a diagrammatic plan view of the turntable of the conveyor;

FIG. 6 is a sectional view taken substantially along line 6—6 of FIG. 5;

FIG. 7 is a diagrammatic sectional view taken substantially along line 7—7 of FIG. 1;

FIG. 8 is a diagrammatic elevational view taken substantially along line 8—8 in FIG. 2;

FIG. 9 is a fragmentary elevational view illustrating a timing sprocket in the conveyor;

FIG. 10 is a fragmentary plan view corresponding to FIG. 9;

FIG. 11 is a diagrammatic view taken substantially along line 11—11 in FIG. 2.

DETAILED DESCRIPTION OF THE PREFERRED EMBODIMENT

Figure 1:
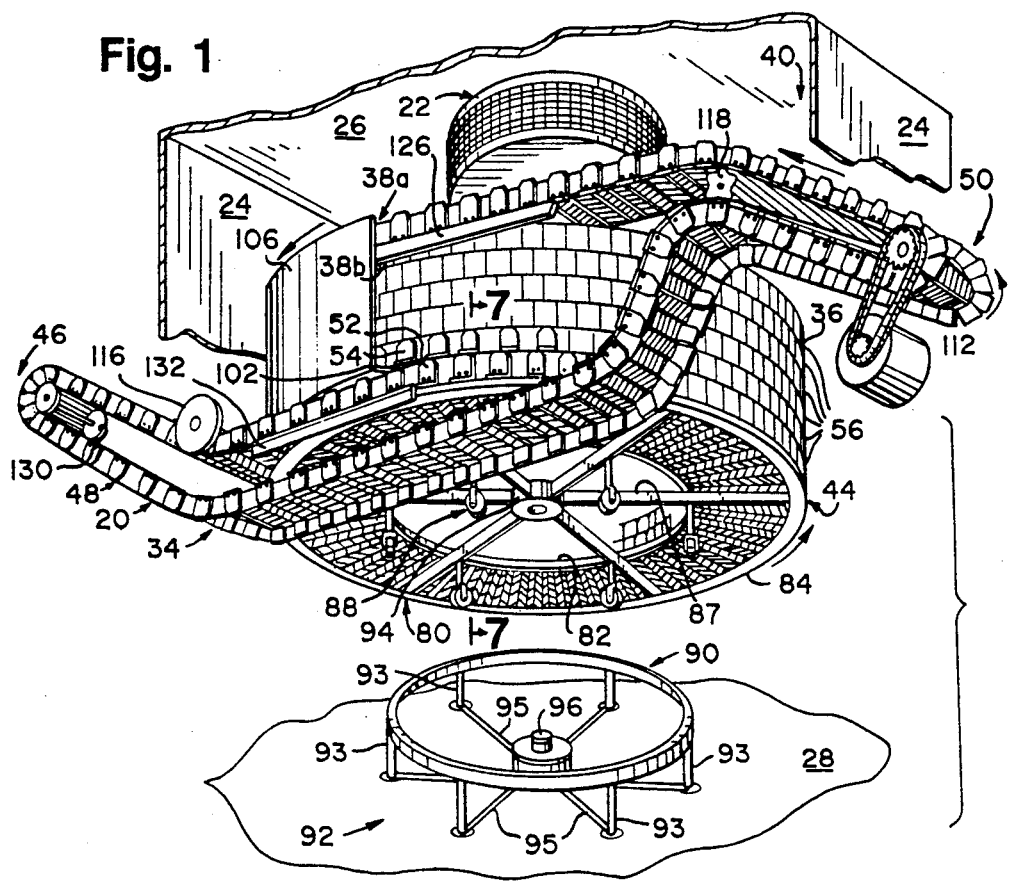
FIG. 1 is a diagrammatic partially exploded perspective view of a freezer in accordance with a preferred embodiment of the invention.

The invention is preferably embodied in a conveyor freezer 10 for effecting rapid heat transfer from a plurality of discrete food items 12 to a fluid such as air which is maintained at sub-ambient temperatures within an enclosure 14. The preferred enclosure has first and second access openings 16 and 18 therein. A conveyor 20 extends through the access openings 16 and 18 to transport the food items through the enclosure. The illustrated freezer employs a mechanical refrigeration apparatus 22 to cool the air in the freezer. Other embodiments of the invention might employ cryogenic refrigeration apparatus, e.g., means for injecting liquid nitrogen ($N_2$) and/or liquid carbon dioxide ($CO_2$), instead of, or in conjunction with, such mechanical refrigeration apparatus.

The illustrated enclosure comprises four vertical sidewalls 24, a top wall 26 and a bottom wall or floor 28. The walls are preferably thermally insulated to facilitate maintenance of large temperature differentials between the interior and exterior of the enclosure. At least one door 30 is preferably provided to enable access to the interior of the enclosure for cleaning and maintenance.

Figure 2:
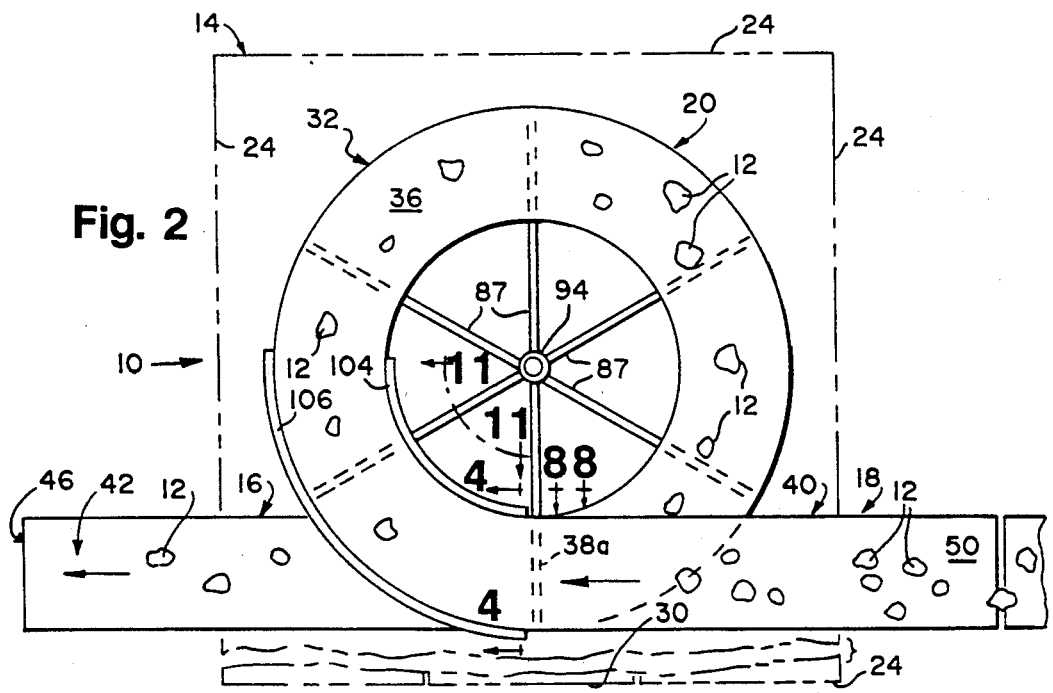
FIG. 2 is a diagrammatic plan view of the conveyor of the freezer of FIG. 1.

The conveyor generally comprises a first portion defining a generally helical stack 32, and a second portion, indicated generally at 34, which follows a predetermined path between the uppermost tier and the lowermost tier of the stack, externally of the stack. Referring to FIG. 2, the stack 32 in the illustrated embodiment rotates in a clockwise direction. It should be appreciated, however, that in other embodiments, the stack might rotate in the opposite direction.

In the illustrated embodiment, the second portion 34 of the belt includes an infeed section 40 leading from an on-loading station 50 outside of the enclosure 14 to the uppermost tier 36 of the stack; a substantially linear output section 42 leading from the lowermost tier 44 of the stack to an off-loading station 46 outside of the enclosure; and a return portion 48 which extends from the off-loading station 46 to the on-loading station generally beneath the aforedescribed portions of the belt, and partially beneath the stack 32.

For convenience of description, the helical stack 32 will be described herein as a series of tiers, each tier comprising a single 360° portion of the helical stack and having upper and lower ends. It should be understood that the upper and lower ends of the tiers do not connote interruptions in the continuity of the belt. To the contrary, the belt as described herein is endless and continuous.

The uppermost tier 36 of the stack has an upper end 38a contiguous with the substantially linear infeed section, and a lower end 38b contiguous with the upper end of the second tier. The lowermost tier has a lower end 52 adjoining the output section, and an upper end 54 disposed substantially thereabove, 360° upstream therefrom in the helical stack. In the embodiment illustrated in FIG. 1, six tiers are shown. However, in most commercial operations, it is believed that a greater number of tiers are likely to be employed. The number of tiers in the helical stack will vary among particular embodiments according to the needs of the particular freezer application. A plurality of intermediate tiers 56 are disposed between the uppermost and lowermost tiers. The uppermost tier 36 and each of the intermediate tiers 56 is supported by contact with the respective tier immediately therebeneath.

The belt is composed of inner side links 58 and outer side links 60 defining opposite flexible sidewalls, and a plurality of generally horizontal, transverse connecting rods 62 extending between the opposite sides. A wire or plastic overlay 64 supported on the rods 62 provides a support surface for food product.

The inner and outer side links 58 and 60 are arranged in alternating, overlapping fashion along each side of the belt. Each of the outer side links is of generally L-shaped configuration, comprising an upstanding, generally vertical portion 66 and a flange portion 68 which extends generally horizontally outward from the bottom of the upstanding portion 66, then extends upward to form a generally vertical tab. Each of the inner links 58 is also of generally L-shaped configuration, comprising an upstanding portion 72 and a generally horizontal flange 74 which extends inwardly relative to the belt along the lower portion of the upstanding portion.

Each of the links 58 and 60 has a pair of openings 76, 78 near the bottom of its respective upstanding portion. In each link, one of the openings 76 is substantially circular, having a diameter slightly greater than the diameter of its associated belt rod. The adjacent opening is a horizontal slot 78 which permits the belt rod 62 to slide relative to the link with a sufficient degree of relative movement to enable the belt to turn from a substantially straight configuration to the curved configuration assumed in the helical stack 32. Each of the rods 62 has enlarged heads 63 at each end. Each of the enlarged heads 63 is disposed between the upstanding portion 66 and the tab 70 of a respective one of the outer side links. This constrains the outer side links from moving inward or outward relative to the rods beyond a limited range of motion defined by the distance between the inner surface of the tab 70 and the outer surface of the upstanding portion 66 of the outer side link.

In accordance with an aspect of the invention, a major portion of the weight of the helical stack and food product supported thereon is carried by a rotatable turntable 80. The preferred turntable is a relatively rigid structure as contrasted with prior art conveyors and the like which have used multiple rolling elements and other moving parts supporting a rotating helical belt stack. The preferred turntable 80 is a substantially rigid, horizontally oriented wheel comprising inner and outer circular rails 82 and 84 which are radially spaced from one another by a distance approximately equal to the distance between the opposite sides of the belt.

In the illustrated embodiment, a major portion (i.e., greater than one-half) of the lowermost tier of the stack 32 is engaged by and supported by the turntable 80, with the inner rail 82 of the turntable directly supporting the inner side of the belt and the outer rail 84 supporting the outer side of the belt. A vertical lip 86 extends upward about the inner periphery of the inner rail 82 to define a minimum inner radius for the lowermost tier 44 of belt and constrain the lower tier against horizontal displacement relative to the turntable.

The inner and outer rails 82 and 84 are connected to a central hub 94 by six radially extending spokes 87. Roller assemblies 88 are positioned on the undersides of the respective spokes at their points of intersection with the inner rail 82, with the rollers having horizontal axes oriented radially relative to the turntable 80.

The rollers 88 travel on a circular track 90 on a base 92 positioned coaxially beneath the turntable 80. The base 92 comprises a plurality of vertical legs 93 supporting the circular track 90, with radial braces 95 connecting the legs to a central post 96. The post interfits with the hub 94 to maintain the turntable rotatably centered on the base. The preferred track 90 has a groove or channel 98 formed therein to support the rollers 88 and maintain the rollers in their proper location on the tract, with a wear strip 99 spanning the bottom of the channel or groove.

The rollers 88 on the turntable are preferably made of an acetyl plastic. The track 90 comprises a steel rail having a polymeric wear strip thereon.

One of the problems inherent in the use of self-stacking belts is that removal of belt from the bottom of the stack or, conversely, infeed of belt into the bottom of the stack, requires that a portion of the belt adjacent the upper end of the lowermost tier be supported in a manner to provide sufficient clearance for belt to travel therebeneath. In accordance with an aspect of the invention, the requisite clearance is preferably provided by support of a minor portion i.e., less than one-half, of the first tier of the belt adjacent the upper end of the first tier through the use of a ramp means comprising inner and outer runners 100 and 102. In the illustrated embodiment, in which belt is removed from the stack at the lower end, the runners 100 and 102 are configured to lift the belt as it enters the lowermost tier. As the belt proceeds along the first tier, the belt is maintained at sufficient elevation to provide clearance for belt exiting the stack immediately beneath the upper portion of the lowermost tier, then slopes downward to the turntable 80. In the illustrated embodiment, the runners 100 and 102 extend through an arc of between about 45° and 120°, preferably about 80°, along the sides of the helical stack to support the belt in this manner.

In accordance with a further aspect of the invention, the runners 100 and 102 engage the undersides of the flange portions 68 of the outer links on the opposite sides of the belt to provide support for the subject portion of the lowermost tier 44 and the tiers thereabove. This enables the lowermost tier to be lifted without requiring a transverse support to extend entirely beneath and across the width of the belt, and without interference with the belt beneath the portion of belt that is being lifted.

The inner runner 100 has a first portion 108 which slopes slightly upward in order to lift the belt as described above, and a second portion 110 which slopes gradually downward to lower the belt onto the turntable. The outer runner is similarly configured. The runners 100 and 102 are supported on part-cylindrical inner and outer vertical walls 104 and 106 which are disposed respectively along the inside and outside of the helical stack 32 through an arc approximately coextensive with the runners 100 and 102.

The illustrated runners 100 and 102 engage the belt in sliding contact. The runners are preferably made of an ultra high molecular weight (UHMW) polyethylene or other suitable wear resistant polymer. Use of this material provides a relatively low friction sliding engagement with the stainless steel belt, and enables operation to be maintained with no significant wear to the belt links due to the sliding contact, and with relatively little wear to the runners themselves. The illustrated runners are of substantially rectangular cross section, and are affixed to their respective walls by transverse, generally horizontal screws or other fasteners.

In the preferred embodiment, the belt is driven by a pair of sprockets having teeth which extend between the flanges 68 of adjacent outer link members on each side of the belt. The drive sprockets are connected by a horizontal shaft which is rotated by a conventional chain drive 112 to an electric motor 114 or other suitable drive units. The belt preferably reverses directions at the drive sprockets.

Turning to the travel of the belt discharged from the lower end of the stack to the output section 42, as the belt leaves the bottom of the stack, it is lifted slightly from the turntable and guided by a pair of substantially linear rails which engage the underside of the outwardly extending flanges 68 of the outer links 60 on opposite sides of the belt. The belt proceeds generally horizontally and to clear the turntable and the helical stack 32, then turns upward around a pair of guide wheels 116 to slope upward toward the off-loading station 46. The guide wheels 116 engage the upper surfaces of the flanges 68 of the outer links.

The belt proceeds out of the enclosure 14 through an access opening, then at the off-loading station 46, turns downward about a roller 130 to reverse directions and proceeds in an inverted orientation downward back through the enclosure, parallel to and beneath the section of the belt, output around a generally cylindrical roller, and from there generally horizontally beneath the turntable to a similar cylindrical roller at which the belt then turns upward. The inverted belt then turns about another cylindrical roller slope downwardly, parallel to and beneath the infeed section 40 through an access opening, to the drive sprockets. The belt then reverses direction 180° at the drive sprockets and slopes upwardly along a first portion of the infeed section. Then slightly downward to the top of the helical stack.

The belt overlay comprises a grid or mesh for supporting food product. As best seen in FIG. 3, the overlay comprises a series of elongated loops which enables belt pitch, i.e., distance between connecting rods, to vary without buckling of the overlay. Due to the configuration of the overlay, certain soft food products are susceptible to damage when the belt pitch changes, particularly at the infeed portion of the belt, when the food product has not been frozen and, therefore, has a soft, vulnerable surface in contact with the overlay. Excessive changes in belt pitch can cause soft food products, such as hamburger patties and fish fillets, to be distorted or torn, leaving the products with a distorted shape, a visible crack, or other flaw after being frozen. Moreover, portions of the product may be pinched and torn away from the food product, which not only damages the food product, but also increases the difficulty of cleaning the belt between uses. Generally, decrease in belt pitch, i.e., compression or collapsing of the belt, is believed to be more deleterious to food than increase in belt pitch, i.e., expansion of the belt. In accordance with a further feature of the invention, to control the belt pitch along the infeed section, a pair of timing sprockets 118 engage the infeed portion of the belt and the returning portion of the belt directly therebeneath, at approximately the location at which the orientation of the infeed section of the belt changes from an upwardly sloping orientation to a slightly downward sloping orientation. The timing sprocket 118 is configured substantially similarly to the drive sprockets described above. As shown in FIGS. 9 and 10, the sprocket 118 engages the belt with teeth 128 which protrude between the flanges 68 of adjacent outer links 60 on the opposite sides of the belt. The timing sprockets 118 on either side are affixed to a common axle or shaft 120. This timing arrangement aids in maintaining substantially uniform spacing between the links along both sides of the belt, which is important to proper stacking of the belt in the helix, and is also important to proper driving of the belt. The timing sprockets are believed to aid in avoiding skipping or jumping of links over the drive sprockets, and also contribute to avoidance of pitching of product on the infeed section of the belt by maintaining substantially uniform belt pitch along the upwardly sloping portion of the infeed section.

If it is desired to avoid any decrease in belt pitch after product has been placed on the belt, the timing sprockets 118 may be employed to maintain a tightly compressed or collapsed configuration of the belt from the infeed section to the upper end of the uppermost tier of the conveyor. If necessary, one or more additional timing sprockets may be employed to assist in maintaining the desired pitch. As shown in FIG. 8, the inner edge of the belt in the stack is fully collapsed, i.e., the outer links 60 along the inner edge of the belt have their edges abutting one another. Thus, if the belt is entirely collapsed or compressed across its entire width in the infeed section, then when the belt enters the helical stack, the outer edge of the belt is expanded while the inner edge remains collapsed or compressed.

In the illustrated embodiment of the invention, as shown in FIG. 1, the belt is maintained in the infeed section in a slightly collapsed or compressed mode, such that as it enters the helix, the inner edge collapses or compresses, while the outer edge expands. Employment of this geometry provides for relatively little change in belt pitch at any particular point across the width of the belt. It will be appreciated that the belt in the embodiment of FIG. 1 is driven along both edges, as contrasted with certain "expand only" belt configurations wherein the belt is driven, i.e., subjected to tension, along only an inner edge thereof.

The portions of the belt which are substantially planar, e.g., the upwardly sloping portion of the infeed and output sections 40 and 42, may be supported by appropriately sloped surfaces fixed beneath the belt, or by other suitable means. To guide the downwardly sloping portion of the infeed section onto the turntable, guide rails 126 are disposed on opposite sides of the belt, engaging the outwardly extending flanges 68 of the outer links. To form the upper tier of the helical stack at the proper radius, guides or wear strips 122 are affixed to the walls on either side of the belt, and engage the outer surfaces of the outer links on opposite sides of the upper tier near the upper end thereof. The guides 122 are substantially coextensive with the walls 104 and 106, extending through an arc of about 80°.

From the foregoing, it will be appreciated that the invention provides a novel and improved conveying system for freezers or for other applications. The invention is not limited to embodiment described above or to any particular embodiment.

While the terms "horizontal," "vertical," etc. have been used herein to refer to the belt in a particular orientation corresponding to the bottom of the belt being disposed generally horizontal and the sides vertical, it will be appreciated that during normal use, various portions of the belt assume various different orientations, and that the invention herein is not limited to use of the belt in particular orientation or orientations.

The invention is believed to provide advantages over known prior art systems employing self-stacking belts in that the system of the invention may be constructed in embodiments which employ relatively few moving parts, and a relatively simple structure which facilitates cleaning and maintenance of components inside the freezer enclosure. The conveyor is driven entirely by a single external drive unit, without the need for motors or other drive components to be disposed within the freezer enclosure. The turntable rotates freely rather than being directly driven, and the rotation of the turntable is the effect of application of force to the belt by the drive unit externally of the freezer enclosure.

The illustrated freezer operates with relatively little slack in the system as compared with known commercially available conveyor freezer units, many of which include four to five feet of slack belt. The illustrated system also differs from some known commercial systems in that it drives the belt along both edges by engaging the side links with the drive sprockets.

The invention is believed to provide a practical and economical alternative to more expensive, more complex systems which are more difficult to clean and maintain in commercial use. Further aspects of the invention are pointed out in the following claims.

What is claimed is:

1. A freezer comprising:
    a structure defining an enclosed interior;
    means for maintaining said enclosed interior below ambient temperature;
    a continuous belt following an endless path at least partially disposed within said enclosed interior for carrying food product;
    said belt comprising a first portion defining a generally helical stack which includes (a) a lowermost tier having an upper end and a lower end, (b) a series of intermediate tiers, and (c) an uppermost tier;
    each of said intermediate tiers and said uppermost tier being supported at least partially by the tier immediately therebeneath;
    said belt further comprising a second portion following a predetermined path between the upper tier and the lower tier externally of said helical stack;
    a substantially rigid rotatable turntable for supporting a major portion of said lower tier in a substantially horizontal configuration;
    means for guiding said second portion of said belt in said predetermined path externally of said helical stack;
    means for driving said belt; and
    ramp means for lifting and supporting a minor portion of said lowermost tier above said turntable in a configuration such that, proceeding from the upper end of the lowermost tier to the lower end thereof, the lowermost tier first slopes slightly upward to facilitate transition of belt between the lower end of the stack and the second portion of the belt, then slopes downward to the turntable.

2. A freezer in accordance with claim 1 wherein said ramp means comprises a pair of runners disposed on opposite sides of said lower tier.

3. A freezer in accordance with claim 1 wherein said ramp means supports a portion of said lowermost tier through an arc of between about 45° and about 120°.

4. A freezer in accordance with claim 1 wherein said second portion comprises an off-loading section extending outward from the lower tier of said helical stack to a delivery location, an infeed section extending from an onloading location to the uppermost tier of said stack, and a return portion extending from said off-loading section to said onloading section;
    said means for driving said belt comprising a pair of drive sprockets engaging opposite sides of the belt;
    said return portion having a section extending beneath and substantially parallel to said infeed section and adjoining said infeed section at said pair of sprockets such that said belt reverses direction as it engages said drive sprockets;
    a pair of timing sprockets spaced from said drive sprockets and engaging, in timed relation, both said infeed portion of said belt and said section of said return portion of said belt extending beneath and substantially parallel to said infeed section.

* * * * *